United States Patent
Schlipf et al.

(10) Patent No.: US 12,534,190 B2
(45) Date of Patent: Jan. 27, 2026

(54) DRIVE SYSTEM FOR A LIFT CONTROL DEVICE OF AN AIRCRAFT, AIRCRAFT WING AND AIRCRAFT

(71) Applicant: Airbus Operations GmbH, Hamburg (DE)

(72) Inventors: Bernhard Schlipf, Hamburg (DE); Dort Daandels, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/967,908

(22) Filed: Dec. 4, 2024

(65) Prior Publication Data

US 2025/0187721 A1    Jun. 12, 2025

(30) Foreign Application Priority Data

Dec. 6, 2023 (EP) .................................. 23214691

(51) Int. Cl.
*B64C 13/38* (2006.01)
*B64C 9/00* (2006.01)

(52) U.S. Cl.
CPC .............. *B64C 13/38* (2013.01); *B64C 9/00* (2013.01)

(58) Field of Classification Search
CPC ........... B64C 13/38; B64C 19/34; B64C 9/00; B64C 9/02; B64C 9/22; B64C 9/34; B64D 45/0005; B64D 2045/001
See application file for complete search history.

(56) References Cited

U.S. PATENT DOCUMENTS

| | | | |
|---|---|---|---|
| 6,466,141 B1 | 10/2002 | Mckay et al. | |
| 2009/0146014 A1 | 6/2009 | Gyuricsko et al. | |
| 2011/0253832 A1* | 10/2011 | Wildman | B64C 9/02 74/89.32 |
| 2011/0290946 A1 | 12/2011 | Peirce | |
| 2012/0325976 A1 | 12/2012 | Parker | |

(Continued)

FOREIGN PATENT DOCUMENTS

| | | |
|---|---|---|
| EP | 1088753 A2 | 4/2001 |
| EP | 4112450 A1 | 1/2023 |
| EP | 3878734 B1 | 7/2023 |

OTHER PUBLICATIONS

European Search Report for corresponding European Patent Application No. 23214691 dated May 7, 2024.

*Primary Examiner* — Rodney A Bonnette
(74) *Attorney, Agent, or Firm* — Greer, Burns & Crain, Ltd.

(57) ABSTRACT

A drive system for a lift control device of an aircraft. The drive system has first and second connection assemblies. The first connection assembly comprises a first track comprising a first end coupled to the lift control device and a track curvature having a radius of curvature; a first guiding element to absorb side loads from the first track; a first drive device to drive the first track, and a second guiding element to sense spanwise movement of the first track. The second connection assembly comprises a second track comprising a first end coupled to the lift control device; a third guiding element to absorb side loads from the second track, and a second drive device to drive the second track. The first and second drives are mechanically coupled by a transmission shaft. When the spanwise movement exceeds a threshold value, the drive system is stopped.

16 Claims, 5 Drawing Sheets

(56) References Cited

U.S. PATENT DOCUMENTS

| | | |
|---|---|---|
| 2013/0126670 A1 | 5/2013 | Vaghela |
| 2019/0002121 A1 | 1/2019 | Young et al. |
| 2021/0061437 A1 | 3/2021 | Daandels et al. |
| 2021/0284320 A1 | 9/2021 | Bauer et al. |
| 2022/0144413 A1 | 5/2022 | Mitchell, III |
| 2023/0002033 A1 | 1/2023 | Schlipf et al. |

* cited by examiner

DRIVE SYSTEM FOR A LIFT CONTROL DEVICE OF AN AIRCRAFT, AIRCRAFT WING AND AIRCRAFT

CROSS-REFERENCES TO RELATED APPLICATIONS

This application claims the benefit of European Patent Application Number 23214691.0 filed on Dec. 6, 2023, the entire disclosure of which is incorporated herein by way of reference.

FIELD OF THE INVENTION

The invention relates to a drive system for a lift control device of an aircraft, such as a slat or a flap of an aircraft wing, in particular a slat or a flap of a fixed wing of an aircraft, an aircraft wing comprising the drive system and an aircraft.

BACKGROUND OF THE INVENTION

Fixed wing aircraft typically include slats movably arranged along the leading edge of each wing and flaps movably arranged along the trailing edge of each wing. By selectively extending and retracting the flaps and/or slats, the aerodynamic flow conditions on the respective wing are influenced so as to increase the lift generated by the wing, for example especially for take-off and landing phases of the flight of the aircraft. During other flight phases, the slats and flaps are typically retracted to minimize drag. In general, such flats and slaps are known as lift control devices and may also be categorized as take-off aids or landing aids.

The slat is supported by at least one track which is movably attached to a fixed leading edge of the wing. In this way the slat can be moved between a retracted position, where it is close to the fixed leading edge, and an extended or deployed position. It is usually moved on a curved path forward and downward relative to the fixed leading edge to come to the deployed position.

These lift control devices collectively form the flap system of the aircraft which is monitored and regulated with respect to the flight situation or configuration by flight control arrangement of the aircraft, for example to carry out take-off and/or landing on airport runway. To do this, the actual flight data of the aircraft is continuously provided to the aircraft flight control system which in turn regulates the actuation of the components of the flap system in order to vary the camber of the lifting wing profile, to vary the lifting wing surface area and/or to influence the boundary layer so as to adjust the lift and drag characteristics of the wing as required.

A slat is commonly moved by the use of two or more tracks which are moved via the action or one or more motors which drive one or more actuators. If the actuators are not properly synchronized, if one or more of the actuators fails or malfunctions, or if there is any failure in the drive mechanism between the actuator and the slat panel, the slat may move asymmetrically, thereby developing skew. It is desirable to avoid excessive skew of the slat. The published patent application US 2019/0 002 121 A1 discloses a slat skew detection system.

SUMMARY OF THE INVENTION

An object of the invention is to provide a drive system for a lift control device of an aircraft which has a robust sensor system.

For achieving such an object, the invention provides a drive system for a lift control device according to one or more embodiments, an aircraft wing, and an aircraft.

The invention provides a drive system for a lift control device of an aircraft. The drive system comprises a first connection assembly and a second connection assembly. The first connection assembly comprises a first track comprising a first end configured to be coupled to the lift control device and a track curvature having a radius of curvature, a first guiding element configured to absorb side loads from the first track by a first introduction means that is configured to couple the rotational degree of freedom around the radius of curvature of the track curvature of the first track; a first drive device configured to drive the first track and a second guiding element that is configured to sense spanwise movement of the first track. The second connection assembly comprises a second track comprising a first end configured to be coupled to the lift control device, a third guiding element configured to absorb side loads from the second track and a second drive device configured to drive the second track. The first and second drive devices are mechanically coupled by a transmission shaft. If the spanwise movement of the first track sensed by the second guiding element exceeds a threshold value, the drive system is stopped.

Preferably, the first drive device is configured to drive the first track in opposing advance or retract directions so as to extend (deploy) and retract the lift control device. Preferably, the second drive device is configured to drive the second track in opposing advance or retract directions so as to extend (deploy) and retract the lift control device. In use, the direction of movement of the first track and the second track is synchronized so that the first and second tracks move in the same direction.

An example of the lift control device is a slat which is arranged along leading edge of the wing of an aircraft, in particular a fixed wing of an aircraft. Alternatively, the lift control device is a flap which is arranged along the trailing edge of a wing, in particular a fixed wing of an aircraft.

The second guiding element serves as a sensor for sensing spanwise motion of the first track. This sensing function can be provided by a mechanical connection, for example by biasing the second guiding element against the first track, for example by the use of one or more biasing elements such as springs. Preferably, the second guiding element senses spanwise motion of the first track in two opposing spanwise directions.

In an embodiment, the second guiding element is provided by a second pair of side rollers. The side rollers are supported on the first track with a spanwise degree of freedom in order to sense spanwise movement of the first track.

The first and second connection assemblies are connected to a common lift control device and cooperate to advance and retract the lift control device to avoid skewing of the lift control device in its advanced, i.e., deployed position. The transmission shaft drives the first and second drive devices so as to advance and retract the first and second tracks, respectively, in a synchronized manner in order to advance and retract the lift control device.

Each lift control device, e.g., a slat or a flat, is connected to two tracks each including a drive device. The first track is configured to be the load supporting track.

Preferably, the introduction means is a strut that is attached to the first track. The strut that is attached to the first track and in operation is also attached to the lift control device. The first track has a length (longest direction).

Preferably, the strut extends at an inclined angle to the length of the first track.

Preferably, a first end of the strut is connected to the first track and the strut extends at an inclined angle to the length of the first track to a second end that is configured to be coupled to the lift control device. This inclined arrangement of the strut provides a configuration with which spanwise loads can be transformed into an axial bending of the first track about its length. The first end of the strut is connected to the first track intermediate the length of the first track.

As used herein, when an element is referred to as being "coupled" to another element, it can be directly coupled to the other element so that there are no intervening elements present or intervening elements may be present between the two elements.

Preferably, the strut is configured to transform spanwise loads into a bending of the first track. This bending of the first track is sensed by the second guiding element. The bending of the first track enhances the spanwise movement of the first track which is detected by the second guiding element.

Preferably, the first guiding element is provided by a first pair of side rollers, the second guiding element is provided by a second pair of side rollers and the third guiding element is provided by a third pair of side rollers. The side rollers of each pair are located on opposing sides of the first track or second track in the spanwise direction.

In some embodiments, the drive system further comprises a switch.

In an embodiment, the switch is coupled to the second pair of side rollers and to the first drive device. The first connection assembly further comprises a torque limiter that is coupleable with the first drive device. The second pair of side rollers acts as a sensor to sense spanwise motion of the first track in opposing directions and is coupled to the switch such that when the sideways motion of the first track detected by the second pair of side rollers exceeds a threshold value, which is preferably predetermined, the switch triggers the toque limiter to inhibit further movement of the transmission shaft. Since further movement of the transmission shaft is prevented, the drive system stops. This embodiment, provides a purely mechanical link that is local to the first connection assembly.

Preferably, the first connection assembly comprises only a single guiding element that is configured to absorb side loads from the first track. Side loads on the first track act spanwise, that is perpendicularly to the length of the fuselage of the aircraft. This simplifies the construction of the first connection assembly.

Preferably, the first track includes only one first pair of side rollers configured to absorb side loads from the first track.

One drive system may be provided for a single lift control device, that is a single slat or a single flap, and may be referred to as a drive station. The drive system may also be referred to as a drive transmission station. A separate drive system may be provided for each of the slats of a wing and/or for each of the flaps of a wing. Preferably, the drive system forms part of a system including a central drive motor and a plurality of such drive systems or stations.

In an embodiment, the first and second track are mechanically coupled by a transmission shaft. Preferably, the transmission shaft forms a centralized shaft line which transmits the drive power from the central drive motor to the several drive stations. The transmission shaft can be used to provide a positive fixed mechanical synchronization of all of the flaps or slats connected to the respective shaft. This allows a synchronization of the flaps between the left lifting wing and right lifting wing to be realized, for controlling or dealing with asymmetric flap deflections.

In an embodiment, the drive system is coupled to a slat/flap system comprising a monitoring system which carries out a continuous monitoring of the transmission shaft. Each wing may include a safety brake with an integrated monitoring sensor that is mechanically coupled to the transmission shaft. The further safety brake is integrated in the central control unit or central drive for the transmission shaft.

In use, the first track and the strut are attached to the lift control device at two positions spaced part spanwise. The second track is connected to the lift control device and is spaced apart by a greater distance from the first track in the spanwise direction such that the strut is positioned between the first and second tracks in the spanwise direction. The transmission shaft may extend substantially parallel to the lift enhancement device and perpendicularly to the opposing direction of movements of the first and second track, that is perpendicularly to the advance movement and retraction movement of the lift control device.

In an embodiment, the first connection assembly further comprises a torque limiter that is coupleable with the first drive device. The switch triggers the torque limiter to stop the drive system, if the spanwise motion of the first track sensed by the second guiding element exceeds a threshold value.

In an embodiment, the switch is provided by a purely mechanical switch and has the form of a mechanical link and provides the threshold value. Preferably, the second guiding element is mechanically coupled to the torque limiter.

In another embodiment, the switch is an electronic switch and sends instructions to a slap/flap control unit. The switch is coupled to the second guiding element and sends instructions to the slat/flap control unit that causes the drive system to stop, if the spanwise motion of the first track sensed by the second guiding element exceeds the threshold value.

Preferably, the slat/flap control unit sends instructions to the power control unit that causes the drive system to stop. For example, the power control unit triggers the torque limiter that prevents further rotation of the transmission shaft.

Preferably, the power control unit causes a system torque limiter to be triggered to inhibit movement of the transmission shaft in order to stop the drive system. Preferably, in the event that the system torque limiter, which is associated with the transmission shaft, is triggered the power control unit causes a warning signal to be transmitted, for example to the cockpit. The pilot can then attempt to restart the drive system.

The switch may be coupled to the slat/flap control unit by a mechanical, an electrical connection or an optical communication connection.

In another embodiment, the slat/flap control unit sends instructions to a central control unit that causes the first drive device to stop driving the first track. For example, the central control unit sends instructions to the first drive device to stop driving the first track, for example by decoupling the torque limiter.

In an embodiment, the switch is coupled to the slat/flap control unit by an electrical communication line, for example by one or more electrically conductive wires. In another embodiment, the switch is coupled to the slat/flap control unit by an optical communication line, for example by infrared communication.

The design of the first and second drive devices may depend on the design of the first track and second track, respectively. In an embodiment, the first track may comprise a rack and pinion arrangement that is coupled to and driven by the first drive device. In an embodiment, the second track comprises a rack and pinion arrangement that is coupled to and driven by the second drive device.

Preferably, the first drive device is a geared rotary actuator that is configured to advance and retract the first track.

Preferably, the second drive device is a geared rotary actuator that is configured to advance and retract the second track.

The first geared rotary actuator may comprise the torque limiter.

In an embodiment, the first connection assembly comprises a rack and pinion arrangement between the first track and the transmission shaft and the second connection assembly comprises a rack and pinion arrangement between the second track and the transmission shaft. The first drive device is a geared rotary actuator that is configured to advance and retract the first track and the second drive device is a geared rotary actuator that is configured to advance and retract the second track. the first and second geared rotary actuators are mechanically coupled to the transmission shaft.

In an embodiment, the triggering of the torque limiter of the first geared rotary actuator causes further movement of transmission shaft to be halted which in turn causes a further torque limiter of a central control unit to be triggered.

In an alternative embodiment, the first connection assembly comprises a drive-strut-lever arrangement and the second connection assembly comprises a drive-strut-lever arrangement.

The first track comprises a second end that opposes the first end. Preferably, the second guiding element is coupled to the first track between the first drive device and the second end.

In an embodiment, the second connection assembly further comprises a second introduction means that is configured to couple the rotational degree of freedom around the radius of curvature of the track-curvature of the second track and a fourth guiding element that is configured to sense spanwise movement of the second track. If the spanwise movement of the second track sensed by the fourth guiding element exceeds a threshold value, the drive system is stopped.

In an embodiment, the first guiding element is provided by a single roller and the second guiding element is provided by a single roller. The two rollers are arranged on opposing sides of the first track and spaced apart along the length of the first track.

In an embodiment, the third guiding element is provided by a single roller and the fourth guiding element is provided by a single roller. The two rollers are arranged on opposing sides of the second track and spaced apart along the length of the second track.

Preferably, the first introduction means is a first strut that is attached to the first track and the second introduction means is a second strut that is attached to the second track.

Preferably, the first strut extends at an inclined angle to the length of the first track. Preferably, a first end of the strut is connected to the first track and extends at an inclined angle to the length of the first track to a second end that is configured to be coupled to the lift control device. The first end of the strut is connected to the first track intermediate the length of the first track.

Preferably, the second strut extends at an inclined angle to the length of the second track. Preferably, a first end of the second strut is connected to the second track and extends at an inclined angle to the length of the second track to a second end that is configured to be coupled to the lift control device. The first end of the second strut is connected to the second track intermediate the length of the second track.

Preferably, each of the first and second connection assemblies further comprises a sensor for sensing spanwise motion of the respective track and if the spanwise motion of the respective track exceeds a threshold value its drive device is caused to stop the driving system, for example by preventing further rotation of the transmission shaft. The sensor may be provided by a further guiding element that is supported on the respective track with a spanwise degree of freedom to sense spanwise movement of the track. For example, the sensor is a pair of rollers, one arranged on opposing sides of the track, that are supported on the respective track with a spanwise degree of freedom to sense spanwise movement of the track in opposing spanwise directions.

The invention also provides an aircraft wing, in particular a fixed aircraft wing, that comprises at least one lift control device and the drive system of any one of the embodiments described herein, the drive system being coupled to that lift control device. The first end of the first track, the second end of the strut and the first end of the second track of the drive system are coupled to the lift control device to advance or retract the lift control device.

In an example, the aircraft wing comprises at least one slat and the drive system is coupled to the slat so that the slat is deployed and retracted by movement of the first and second track. In another example, the aircraft wing comprises a flap and the drive system is coupled to the flap to drive the flap. In another example, the aircraft wing comprises two or more slats and a drive system according to any one of the embodiments described herein for each of the slats, each drive system being connected to the respective slat by way of its first and second track. In another example, the aircraft wing comprises two or more flaps and a drive system according to any one of the embodiments described herein for each of the flats, the drive system being connected to the respective flap by way of its first and second track.

When the drive system is mounted on the wing, the first track extends along a first longitudinal axis and is mounted to the main wing movably along the first longitudinal axis. The second track extends along a second longitudinal axis and is mounted to the main wing movably along the second longitudinal axis. The first track and the second track are spaced apart from one another in the spanwise direction and the first longitudinal axis is parallel to the second longitudinal axis.

In an embodiment, the first drive unit device comprises a drive pinion engaging the first track rack for driving the first track along the first longitudinal axis and the second drive unit device comprises a drive pinion engaging the second track rack for driving the second track along the second longitudinal axis. The drive pinions are driven by the transmission shaft which is in turn driven by the power control unit.

The invention also provides an aircraft comprising an aircraft wing comprising the drive system according to any one of the embodiments described herein.

Preferably, the first end of the first track is coupled to the lift control device by a first flexible connection and the first end of the second track is coupled to the lift control device by a second flexible connection.

Preferably, the first introduction means, e.g. the first strut, is coupled to the lift control device by a third flexible connection and to the first track by a fourth flexible connection and/or the second introduction means, e.g., the second strut, is coupled to the lift control device by a fifth flexible connection and to the second track by a sixth flexible connection.

Preferably, the first, second, third, fourth, fifth and sixth flexible connections each comprise a ball joint.

In an embodiment, the aircraft comprises a fuselage and left and right fixed wings and each of the left and right fixed wings comprises the drive system according to any one of the embodiments described herein.

BRIEF DESCRIPTION OF THE DRAWINGS

Embodiments of the invention are explained below referring to the accompanying drawings in which.

DETAILED DESCRIPTION OF THE PREFERRED EMBODIMENTS

Figure 1:
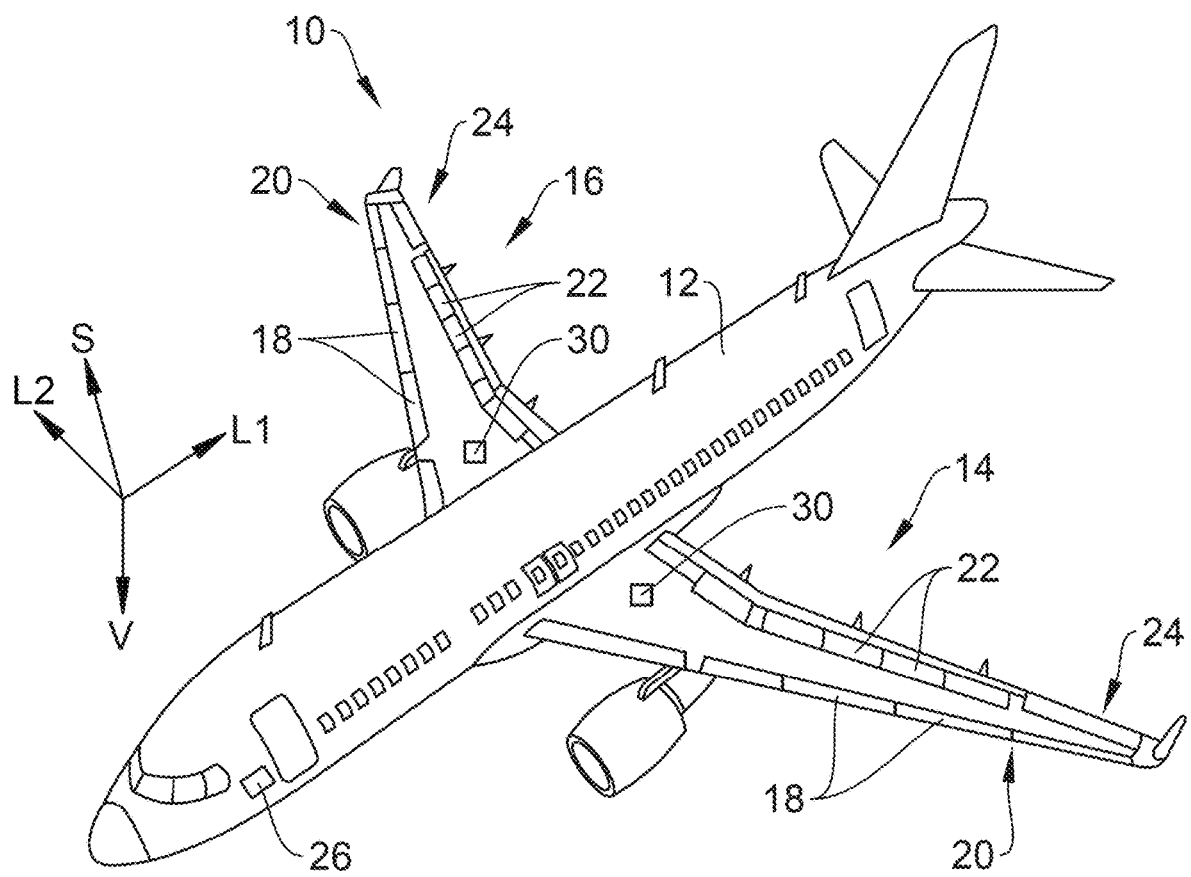
FIG. 1 illustrates an aircraft.

FIG. 1 illustrates an aircraft 10 which comprises a fuselage 12, a fixed left wing 14 and a fixed right wing 16 connected to and extending from opposing sides of the fuselage 12.

The aircraft 10 has three axes which are orthogonal to each other, namely a longitudinal axis L1, a lateral axis L2 and a vertical axis V. Each wing 14, 16 extends in a direction which usually has components of these three axes of the aircraft 10. The direction in which each wing 14, 16 extends between the fuselage 12 of the aircraft 10 and the wing Lip is called the spanwise direction S of that wing. The spanwise direction S extends in the plane of the wing 14, 16 and may be parallel to the leading edge 20 of the wing 14, 16. However, it may also deviate from being parallel to the leading edge 20 in certain cases, depending on the specific shape of the wing 14, 16.

Each of the wings 14, 16 includes moveable slats 18 that are movably arranged in the spanwise direction along the leading edge 20 of the respective wing 14, 16 and movable flaps 22 which are arranged along the trailing edge 24 of the respective wing 14, 16.

The aircraft 10 further comprises a control unit 26 that receives actual current flight data and control commands and generates actuating information for setting the position of the slats 18 and flaps 22 dependent on at least one of the flight data and the control commands. For example, the position of the slats 18 and flaps 22 may be extended or retracted so as to control the lift of the aircraft 10, in particular, during take-off and landing of the aircraft 10. Slats 18 and flaps 22 are examples of lift control devices.

Figure 2A:
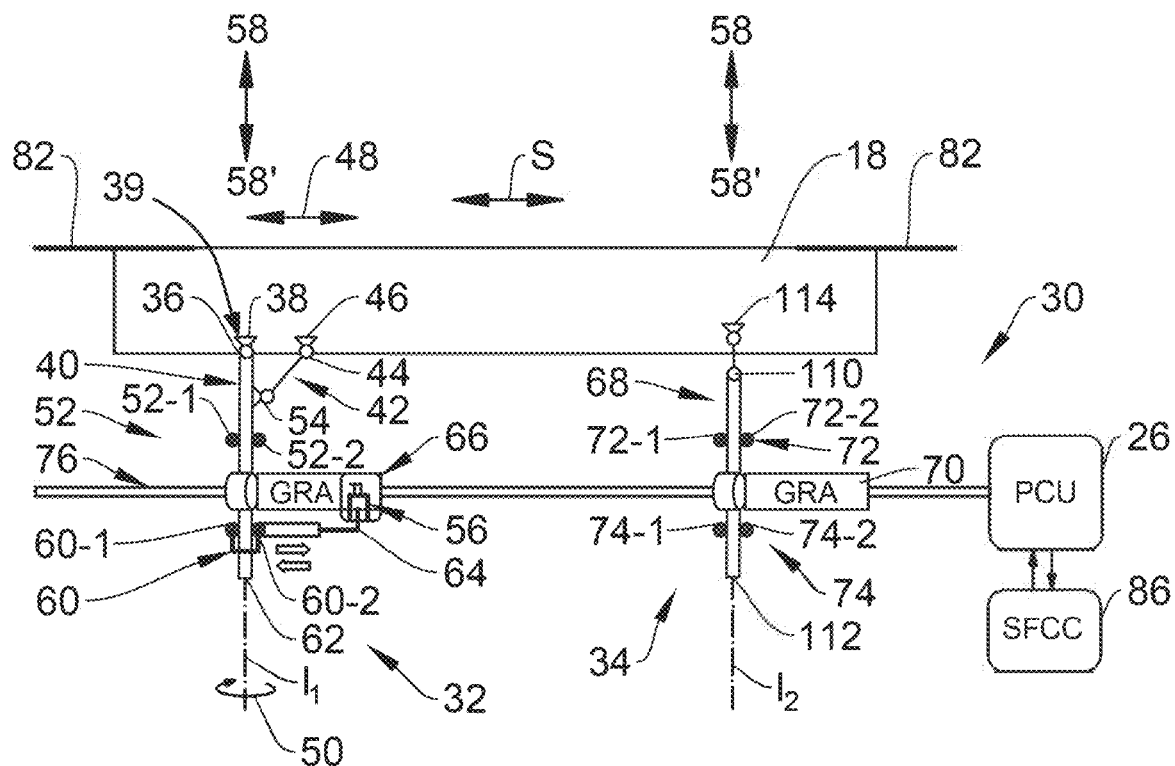
FIG. 2A illustrates a schematic view of a drive system and lift control device according to a first embodiment.

FIG. 2 illustrates a drive system 30 for a lift control device, which in this embodiment, is a slat 18. The drive system 30 is used for controlling the position of the slat 18. The drive system 30 may, however, be used for controlling the position of a flap 22. The drive system 30 comprises a first connection assembly 32 and a second connection assembly 34 which are connected to the slat 18 at two positions 38, 46 which are spaced apart from one another in the spanwise direction S.

The first connection assembly 32 comprises a first track 40 and a strut 42. The first track 40 and its longitudinal axis l1 are typically curved and curve downwards, in the vertical V axis, along the longitudinal axis l1. The first track 40 has a radius of curvature r1. The first track 40 has a first end 36 that is coupled to the slat 18 at the connection 38 and an opposing second end 62. In the examples provided herein, the connection 38 includes a ball joint 39. The strut 42 has a first end 54 which is connected to the first track 40 and extends at an inclined angle to the first track 40. The strut 42 has a second end 44 that is connected to the slat 18 at a position 46 which is spaced apart from the position 38 at which the first track 40 is connected to the slat 18 in the spanwise direction. The spanwise direction of the slat 18 is the same direction as the spanwise direction S of that wing 14, 16 or parallel thereto.

The first connection assembly 32 further comprises first guiding element 52 having the form of a pair of rollers 52.1, 52.2 that is coupled to the first track 40. One roller 52.1, 52.2 is positioned on opposing sides of the first track 40 in the spanwise direction. The first guiding element 52 is configured to absorb side loads from the first track 40 and is positioned between the connection between the first end 54 of the strut 42 and the first track 40.

The first guiding element 52 is configured to absorb side loads from the first track 40 by the strut 42 that is configured to couple the rotation degree of freedom around the radius of curvature of the first track 40. The strut 42 may be referred to as a side stay structure or side stay angle. The strut 42 is able to transform spanwise loads, indicated schematically in FIG. 2 by the arrow 48, into a bending of the first track 40 around its longitudinal axis l1 as is indicated in FIG. 2 by the arrow 50.

The first connection assembly 32 further comprises a first drive device 56 for driving the first track 40. The first drive device 56 is coupled to the first track 40 so as to either advance the first track 40 along its longitudinal axis l1, as indicated by the arrow 58, or retract the first track 40 in the opposing direction along its longitudinal axis l1, as indicated by the arrow 58'.

Figure 2B:
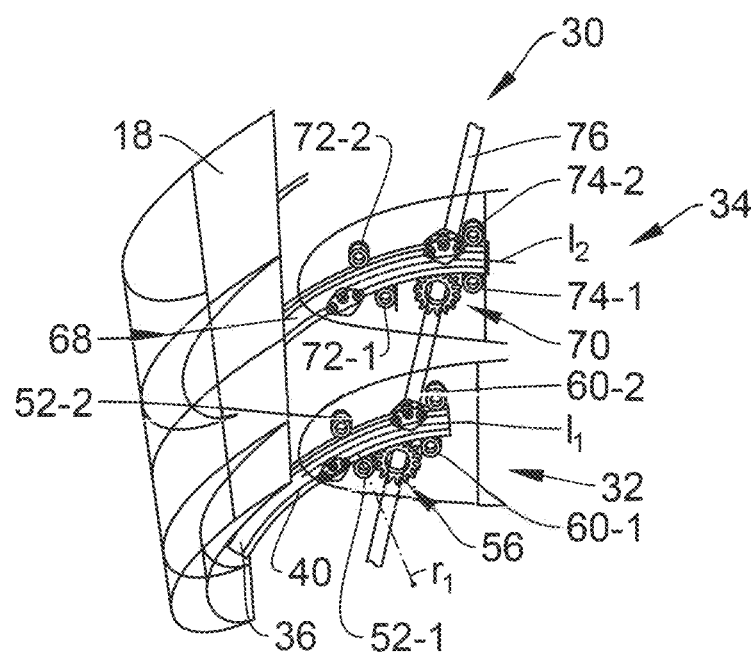
FIG. 2B illustrates a drive arrangement for use with the drive system according to any one of the embodiments described herein.
Figure 2C:
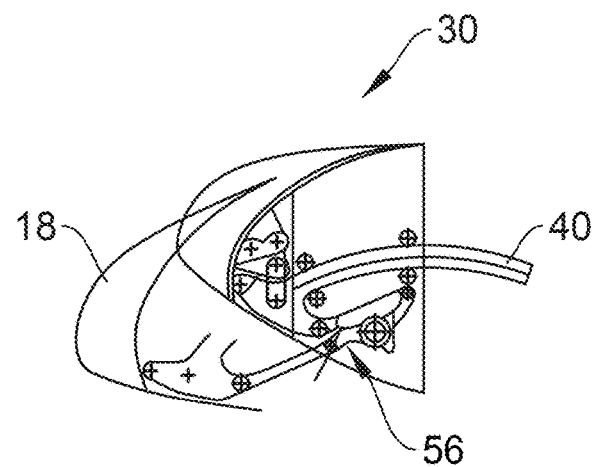
FIG. 2C illustrates a drive arrangement for use with the drive system according to any one of the embodiments described herein.

In an embodiment illustrated in FIG. 2B, the first track 40 has a rack 40.1 and pinion 40.2 arrangement and the first drive device 56 is a geared rotary actuator, with the pinion being driven by the geared rotary actuator which in turn is driven by the transmission shaft 76 and power control unit 26. Alternatively, a drive-strut-lever arrangement as illustrated in FIG. 2C may be used.

The first connection assembly 32 further comprises a second guiding element 60 in the form of a second pair of side rollers 60.1, 60.2. The second guiding element 60 is positioned between the first drive device 56 and the second end 62 of the first track 40. The second guiding element 60 is supported on the first track 40 with a spanwise degree of freedom, for example by using a biasing element such as a spring. The second guiding element 60 can sense movement of the first track 40 in opposing spanwise directions. A switch 64 is coupled between the second guiding element 60 and the first drive device 56.

If the second guiding element 60 senses that the spanwise motion of the first track 40 exceeds a threshold value, the switch 64 causes the first drive device 56 to stop driving. For example, the first drive device 56 may comprise a torque limiter 66. The switch 64 triggers the torque limiter 66 to inhibit further movement of the transmission shaft 76 so that the first drive device 40 no longer drives the first track 40 and no longer advances or retracts the slat 18.

In a first embodiment, as illustrated in FIG. 2, the switch 64 has the form of a mechanical link which has a threshold which triggers the torque limiter 66 of the first drive device 56, which in this embodiment, is a geared rotary actuator. In this embodiment, the switch 64 is entirely mechanical and local to the first connection assembly 32. Triggering of the torque limiter 66 causes the drive system 30 to stop.

In some embodiments, the switch 64 may be a proximity sensor, also known as a near far sensor.

The second connection assembly 34 comprises a second track 68 having a first end 110 hat is coupled to the slat 18 at position 114 and a second end 112 that opposes the first end. The second connection assembly further comprises a second drive device 70 which is coupled to the second track 58 so as to drive the second track 68 in two opposing directions along the longitudinal axis l2 of the second track 68, as indicated with the arrow 48', so as to advance or retract the slat 18. The longitudinal axis l2 of the second track 68 and the longitudinal axis l1 of the first track 40 are parallel.

The second track 68 may also have a rack 70.1 and pin 70.2 arrangement and the second drive device 70 can be provided by a geared rotary actuator to drive the rack and pinion arrangement to advance and retract the second track 68 in the opposing directions indicated by the arrow 48'. The second connection assembly 34 further comprises a third guiding element 72 which has the form of a pair of rollers 72.1, 72.2 which are positioned on opposing sides of the second track 68 and a fourth guiding element 74 in the form of a pair side rollers 74.1, 74.2 which are positioned on opposing sides of the second track 68. The third and fourth guiding elements 72, 74 may be used to determine absorb side loads on the second track 68.

In some embodiments, the first and second drive devices 56, 70 are located within the wings 14, 16 and are coupled to the slat 18 and the respective tracks 40, 68 in any suitable fashion. The first and second tracks 40, 68 are movably attached to a fixed leading edge 20 of the wing 14, 16. In this way the slat 18 can be moved between a retracted position, where it is close to the fixed leading edge 20, and an extended or deployed position. It is usually moved on a curved path forward and downward relative to the fixed leading edge 20 to come to the deployed position.

The first and second tracks 40, 68 are mechanically coupled to the transmission shaft 76 which is coupled to and driven by the control unit 26. The strut 42 of the first connection assembly 32 is positioned in the spanwise direction between the tracks 40, 68 of the first and second connection assemblies 32, 34. second end 44 of the strut 42 is connected in the spanwise direction between the positions 38, 114 at which the tracks 40, 68 of the first and second connection assemblies 32, 34 are connected to the slat 18.

To advance or retract the slat 1.8, the slat 18 moves together with the first and second tracks 40, 68 via the action of the respective drive device 56, 70. If the drive devices 56, 70 are not properly synchronized, or if one or more of the drive devices 56, 70 fails or malfunctions, or if there is any failure in the drive mechanism of one or both of the first and second connection assemblies 32, 34, the slat 18 may move asymmetrically, thereby developing skew.

The slat 18 is considered to be skewed when a portion of the front end near the first side end 78 is not aligned with a portion of the front end near the second side end 80, and vice-versa, in a plane 82, as illustrated in FIG. 2. The slat 18 is said to be skewed if the slat is not aligned with the plane 82 but forms an angle 84 with plane 82, as illustrated in FIG. 3.

In this embodiment, the second connection assembly 34, in particular the second track 68, is connected to the slat 18 at a single position 114 and does not include an additional strut. The first connection assembly 32 includes only a single guiding element 52 which is configured to absorb side loads, since it also has the strut 42. The second guiding element 60 provides a sensing arrangement for sensing skew of the slat 18. The second connection assembly 34 does not include a sensing guiding element for sensing skew of the slat 18.

Figure 3:
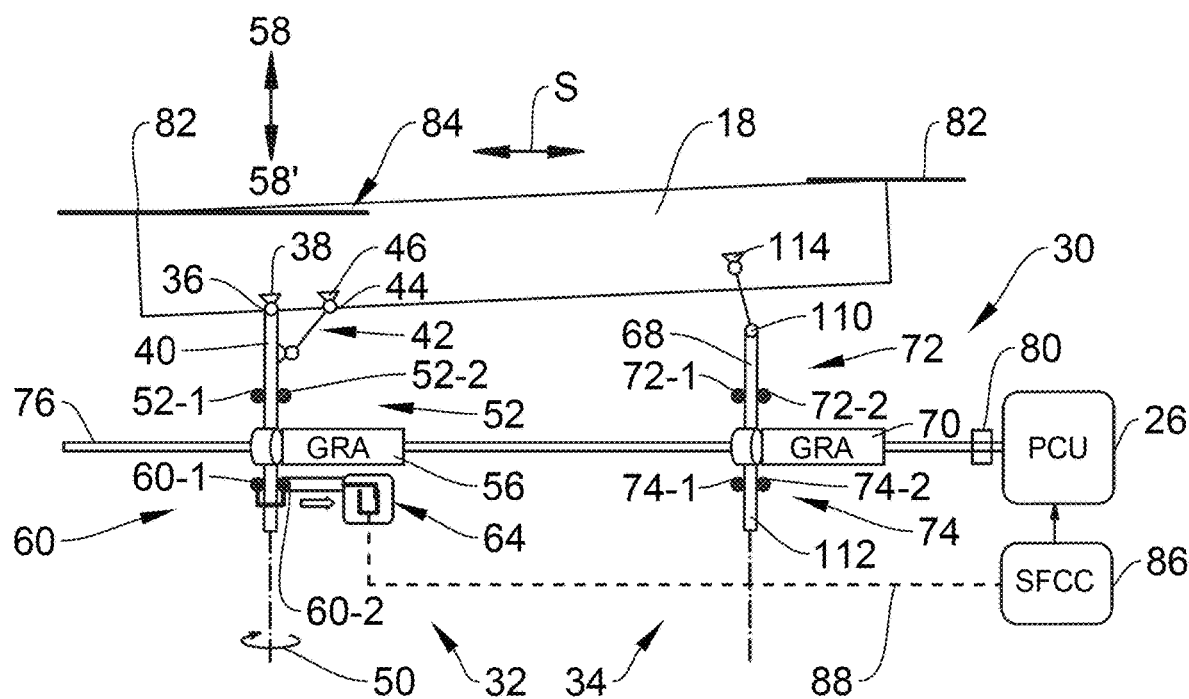
FIG. 3 illustrates a schematic view of a drive system and lift control device according to a second embodiment.

FIG. 3 illustrates a slat 18 and its drive system 30 according to a second embodiment. The drive system 30 according to the second embodiment differs from that illustrated in FIG. 2 in the form of the switch 64. In this embodiment, the switch 64 sends instructions to a slat/flap control system 86 by way of communication line 88 when the second guiding means 60 detects that the spanwise motion of the first track 40 exceeds a threshold value.

FIG. 3 illustrates a situation in which the first track 40 is being retracted by the first drive device 56, but the second connection assembly 34 is malfunctioning such that the second track is not being retracted. This has resulted in skew of the slat 18 as can be seen by the deviation from the plane 82 on opposing sides of plane by the opposing ends of the slat 18. This skew is detected by the second guiding means as an increased spanwise load on the first track 40.

In an embodiment, the slat/flap control system 86 then sends instructions to the central control unit 26 which then instructs the first drive device 56 to stop the driving system 30. For example, in the event that the second drive device 70 which is coupled to the second track 68 stops working, the slat 18 may be skewed, as indicated in FIG. 3 by a deviation from the plane 82. This skew 84 of the slat 18 causes spanwise load on the two point connection 38, 46 of the first connection assembly 32 provided by the first track 40 and strut 42 which causes the first track 40 to bend in the direction of the arrow 50 around the longitudinal axis l1. This additional spanwise movement is detected by the second pair of rollers 60.1, 60.2 which as supported on the track 40 with a spanwise degree of freedom. If the second pair of rollers 60.1, 60.2 detect that the side movement exceeds a threshold value, the switch 64 causes the drive system 30 to stop. In this embodiment, the switch 64 operates electronically and sends instructions to the slat/flap control unit 86 via connection line 88 which sends instructions to the power control unit 26 which stops the drive system 30, for example by inhibiting further movement of the transmission shaft 76 by triggering a system torque limiter 80 coupled with the transmission shaft 76. The power control unit 26 may indicate failure via the slat/flap control unit 86 to the cockpit display. The pilot may then take remedial action, for example by reversing or attempting to reverse the drive system 30.

Figure 4:
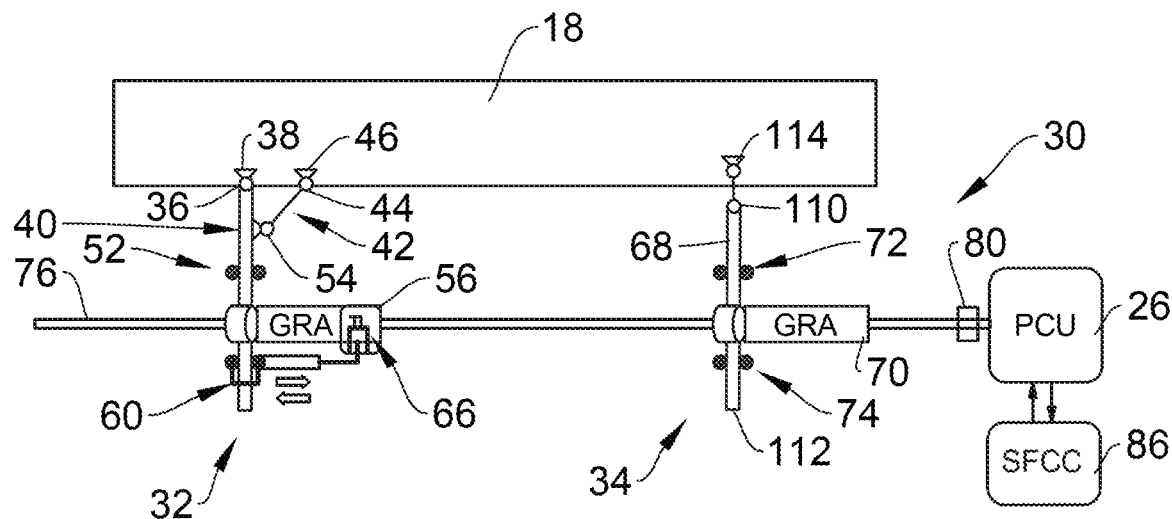
FIG. 4 illustrates a schematic view of a drive system and lift control device according to a third embodiment.

FIG. 4 illustrates a slat 18 with its associated drive system 30 according to a third embodiment. The drive system 30 includes a switch 64 in the form of a mechanical link with a threshold that triggers torque limiter 66 of the first drive device 56 similar to that of the first embodiment. In this embodiment, the torque limiter 66 located within the first drive device 56 further causes movement of the transmission shaft 76 to be stopped. This may in turn cause a torque limiter 80 of the control unit 26 to stop. The power control unit 26 may indicate failure via the slat/flap control unit 86 to the cockpit display. The pilot may then take remedial action, for example by reversing or attempting to reverse the drive system 30.

Figure 5:
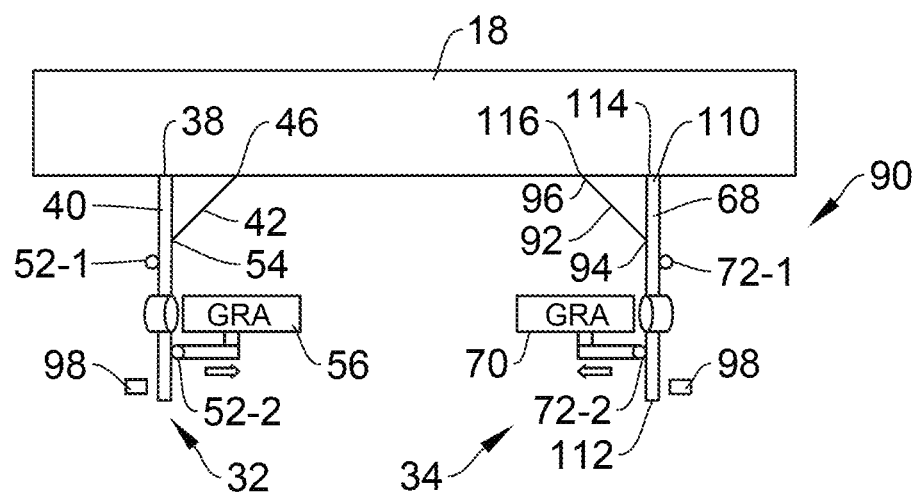
FIG. 5 illustrates a schematic view of a drive system and lift control device according to a fourth embodiment.

FIG. 5 illustrates a slat 18 with its associated drive system 90 according to a fourth embodiment. The drive system 90 comprises a first connection assembly 32 comprising the first track 40 comprising the first end 36 that is coupled with the slat 18 at the position 38 and the first strut 42 that is attached to the first track 40 at the first end 54 and to the slat 18 at the second end 44 at the position 46. The first strut 42 extends at an inclined angle to the length of the first track 40. The first end 36 of the strut 42 is connected to the first track 40 intermediate the length of the first track 40.

The first connection assembly 32 comprises the first guiding element 52 that is configured to absorb side loads from the first track 40, and the first drive device 56 configured to drive the first track 40 in opposing directions along the longitudinal axis 11 of the track 40. In an embodiment, the first guiding element 52 comprises one rollers 52.1 which is arranged on the opposing sides of the first track 40 from the strut 42. The second guiding element 60 comprises a single roller 60.1 that is coupled to the first drive device 56.

The drive system 90 comprises the second connection assembly 34 comprising: the second track 68 comprising the first end 110 coupled to the slat 18 at position 114 and. The second connection assembly 34 further comprises a second strut 92 that is attached to the second track 68 at a first end 94 and to the slat 18 at its second end 96 at position 116. The second strut 92 extends at an inclined angle to the length of the second track 68. The first end 94 of the second strut 92 is connected to the second track 68 intermediate the length of the second track 68. The first and second struts 42, 92 face towards each other so that they are located in the spanwise direction between the first and second tracks 40, 68.

The second connection assembly 34 comprises the third guiding element 72 configured to absorb side loads from the second track 68, and a second drive device 70 configured to drive the second track 68 in opposing directions along the longitudinal axis 12. The second guiding element 72 comprises a single side rollers 72 which is arranged on the opposing sides of the second track 68 from the strut 92. The second assembly comprises a fourth guiding element which has the form of a single roller that is arranged on the opposing side of the second track 68 from the roller 72.1 that is coupled to the second drive device 70.

Each of the first and second connection assemblies 32, 34 may further comprise a sensor 98 for sensing spanwise motion of the respective track 40, 68. If the spanwise motion of the respective track 40, 68 exceeds a threshold value its drive device 56, 70 is caused to stop the driving drive system 30 for example by triggering a torque limiter associated with the first drive device 56 or second drive device 70. The first drive device 56 and the second drive device 70 may each comprise a rack and pinion arrangement, the pinion being coupled to the transmission shaft. Alternatively, a drive-strut-lever arrangement may be used.

In this embodiment, each of the two connection assemblies 32, 34 is connected to the slat 18 at two points. Further, while only one ball joint 39 is illustrated in reference to FIG. 2, it should be understood that all of the connections (e.g., the connection 38, the position 46 at the second end 44 of the strut 42, the connection at the first end 54 of the strut 42, the position 114 at the first end 110 of the second track 68, the connection at the first end 94 of the second strut 92, and the connection at the second end 96 of the second strut 92) can include the ball joint 39 as stated herein.

Figure 6:
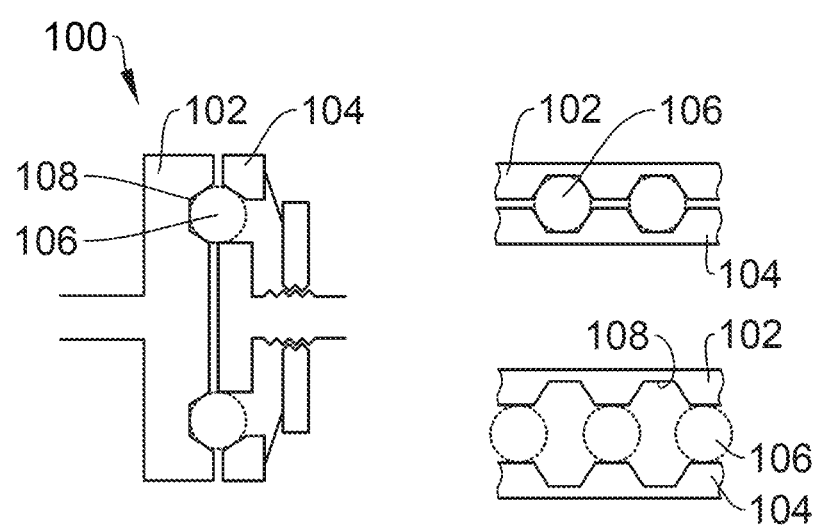
FIG. 6 illustrates a use of a torque limiter which may be used with the drive system of any one of the embodiments.

FIG. 6 illustrates an example of a mechanical torque limiter 100 which may be used in the drive system 30 according to any one of the first, second, third and fourth embodiments. This type of mechanical torque limiter 100 is also referred to as a ratcheting type or ball and cam type torque limiter. The drive side 102 engages with the driven side 104 using a series of balls or rollers 106. The drive side 102 is coupled to the first drive device 56, which may comprise a geared rotary actuator, and the driven side 104 is coupled to the first track 40. The balls 106 are placed in a small groove or indentation 108 between the two sides.

In the engaged position the balls 106 are located between the grooves 108 formed in the facing surfaces of the driving side 102 and the driven side 104. In the disengaged position, the balls are located on the facing surfaces the driving side 102 and the driven side 104 rather than in the grooves 108.

Spring forces normal to the indentation 108 are applied such that a minimum tangential force or torque is required to disengage the driving side 102 and driven side 104. This minimum torque corresponds to the threshold value of the spanwise motion of the first track 40 which triggers the torque limiter and causes the drive system to stop.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST 10 aircraft
12 fuselage
14 wing
16 wing
18 slat
20 leading edge
22 flap
24 trailing edge
26 control unit
30 drive system
32 first connection assembly
34 second connection assembly
36 first end
38 connection
40 first track
42 strut
44 second end
46 connection
48 arrow
50 arrow
52 first guiding element
52.1 52.2 roller
54 first end
56 first drive device
58 arrow
60 second guiding element
60.1 60.2 roller
62 second end
64 switch
66 torque limiter
68 second track
70 second drive device
72 third guiding element
72.1, 72.2 roller
74 fourth guiding element
74.1, 74.2 roller
76 transmission shaft
78 first side end
78' second side end
80 torque limiter
82 plane
84 skew
86 slat/flap control system
88 communication line
90 drive system
92 second strut
94 first end
96 second end
98 sensor
100 mechanical torque limiter
102 drive side
104 driven side
106 ball
108 groove
110 first end
112 second end
114 connection
116 connection
L1 longitudinal axis
L2 lateral axis
V vertical
S spanwise
l1 longitudinal axis
l2 longitudinal axis
r1 radius of curvature

The invention claimed is:

1. A drive system for a lift control device of an aircraft, the drive system comprising:
a first connection assembly comprising:
a first track comprising a first end configured to be coupled to the lift control device and a track curvature having a radius of curvature;
a first guiding element configured to absorb side loads from the first track by a first introduction means configured to couple a rotational degree of freedom around the radius of curvature of the track curvature of the first track, the first introduction means coupled to the first track at a first spanwise location and coupled to the lift control device at a second spanwise location different than the first spanwise location;
a first drive device configured to drive the first track, and a second guiding element configured to sense spanwise movement of the first track, and
a second connection assembly comprising:
a second track comprising a first end configured to be coupled to the lift control device;

a third guiding element configured to absorb side loads from the second track, and a second drive device configured to drive the second track;

wherein the first and second drive devices are mechanically coupled by a transmission shaft, and wherein when the spanwise movement of the first track sensed by the second guiding element exceeds a threshold value, the drive system is stopped.

2. The drive system according to claim 1, wherein the second guiding element is provided by a second pair of side rollers supported on the first track with a spanwise degree of freedom to sense spanwise movement of the first track.

3. The drive system according to claim 1, wherein the first introduction means comprises a strut configured to transform spanwise loads into a bending of the first track.

4. The drive system according to claim 1, wherein the first connection assembly comprises a rack and pinion arrangement between the first track and the transmission shaft and the second connection assembly comprises a rack and pinion arrangement between the second track and the transmission shaft, and wherein the first drive device is a geared rotary actuator configured to advance and retract the first track and the second drive device comprises a geared rotary actuator configured to advance and retract the second track, and wherein the first and second geared rotary actuators are mechanically coupled by the transmission shaft.

5. The drive system according to claim 1, wherein the first connection assembly comprises a drive-strut-lever arrangement and the second connection assembly comprises a drive-strut-lever arrangement.

6. The drive system according to claim 1, further comprising a switch coupled to the first drive device and the second guiding element, wherein the first connection assembly further comprises a torque limiter configured to be coupled with the first drive device, wherein the switch triggers the torque limiter to inhibit further movement of the transmission shaft, when the spanwise movement of the first track sensed by the second guiding element exceeds the threshold value.

7. The drive system according to claim 1, further comprising a switch that is coupled to the second guiding element, wherein the switch sends instructions to a slat/flap control unit that causes the drive system to stop, when the spanwise movement of the first track sensed by the second guiding element exceeds the threshold value.

8. The drive system according to claim 7, wherein the slat/flap control unit sends instructions to a power control unit that causes the drive system to stop.

9. The drive system according to claim 8, wherein the power control unit causes a system torque limiter to be triggered to inhibit movement of the transmission shaft in order to stop the drive system and causes a warning signal to be transmitted.

10. The drive system according to claim 7, wherein the switch is coupled to the slat/flap control unit by a mechanical connection, an electrical connection, or an optical communication connection.

11. The drive system according to claim 1, wherein the second connection assembly further comprises a second introduction means configured to couple the rotational degree of freedom around the radius of curvature of the track-curvature of the second track and a fourth guiding element configured to sense spanwise movement of the second track, wherein when the spanwise movement of the second track sensed by the fourth guiding element exceeds a threshold value, the drive system is stopped.

12. An aircraft wing comprising:
the drive system according to claim 1, wherein the first end of the first track and the first end of the second track of the drive system are coupled to the lift control device to advance or retract the lift control device.

13. The aircraft wing according to claim 12, wherein the lift control device is a slat or a flap of an aircraft wing.

14. The aircraft wing according to claim 12, wherein the first end of the first track is coupled to the lift control device by a first flexible connection, or the first end of the second track is coupled to the lift control device by a second flexible connection, or the first introduction means is coupled to the lift control device by a third flexible connection and to the first track by a fourth flexible connection, or a second introduction means is coupled to the lift control device by a fifth flexible connection and to the second track by a sixth flexible connection, or any combination thereof.

15. The aircraft wing according to claim 14, wherein the first, second, third, fourth, fifth and sixth flexible connections each comprise a ball joint.

16. An aircraft comprising:
the aircraft wing according to claim 12.

* * * * *